United States Patent [19]

Shanks

[11] Patent Number: 4,544,998
[45] Date of Patent: Oct. 1, 1985

[54] SEALED LAMP
[75] Inventor: Bruce E. Shanks, Chesterland, Ohio
[73] Assignee: General Electric Company, Schenectady, N.Y.
[21] Appl. No.: 674,358
[22] Filed: Nov. 21, 1984

Related U.S. Application Data

[63] Continuation-in-part of Ser. No. 426,488, Sep. 29, 1982, abandoned.

[51] Int. Cl.[4] .................................... F21V 29/00
[52] U.S. Cl. .................................. 362/267; 362/306; 362/310; 362/311
[58] Field of Search ................. 362/61, 80, 83, 263, 362/267, 296, 306, 307, 310, 311, 341, 375, 433, 455, 456

[56] References Cited

U.S. PATENT DOCUMENTS

| | | | |
|---|---|---|---|
| 3,086,104 | 4/1963 | Atkin | 362/306 |
| 3,732,415 | 5/1973 | Lindae . | |
| 3,898,451 | 8/1975 | Murphy et al. | 362/267 |
| 4,128,864 | 12/1978 | Brussee et al. | 362/306 |
| 4,240,131 | 12/1980 | Albrecht | 362/267 |
| 4,318,161 | 3/1982 | Shanks | 362/306 |
| 4,425,606 | 1/1984 | Shanks et al. | 362/267 |
| 4,447,862 | 5/1984 | Shanks | 362/267 |

FOREIGN PATENT DOCUMENTS 0612099  11/1948  United Kingdom ............... 362/267

Primary Examiner—Parshotam S. Lall
Assistant Examiner—W. R. Wolfe
Attorney, Agent, or Firm—J. F. McDevitt; Philip L. Schlamp; Fred Jacob

[57] ABSTRACT

A rectangular or other polygonal shaped lamp, such as a headlamp, comprising a lens member sealed to a reflector member. The lens member is provided with a rearwardly projecting polygonal rim having a surface which fits against and is sealed to a front rim of the reflector unit. The reflector front rim is provided with frontwardly projecting positioning members near at least two diagonally opposite corners, which fit inside corresponding corners of the lens rim for aligning the lens and reflector members together during sealing.

2 Claims, 3 Drawing Figures

SEALED LAMP

CROSS-REFERENCE TO RELATED APPLICATION

This application is a continuation-in-part of application Ser. No. 426,488, filed Sept. 29, 1982, now abandoned.

Ser. No. 365,435, filed Apr. 5, 1982, Bruce E. Shanks, "Sealed Beam Lamp Unit Sealing Surfaces," assigned the same as this invention and now U.S. Pat. No. 4,447,862.

BACKGROUND OF THE INVENTION

The invention is in the field of sealed rectangular or polygonal lamps, such as automobile headlamps, having a lens member secured to a reflector member by suitable means such as with adhesive or by heat-sealing.

The above-identified patent application is directed to the assembly and sealing together of lens and reflector members, and describes problems caused by stress and molding flaws when the lens and reflector are made of glass which has been molded or pressed into the desired shapes. The patent application also discloses a rectangular headlamp having a glass lens member adhesively sealed to a glass reflector member, one of these members having protruding "keys" near the corners which fit into corresponding recesses in the other member, to aid in aligning the members together while being adhesively sealed together.

SUMMARY OF THE INVENTION

Objects of the invention are to provide improved and simplified lamp lens and reflector configurations for facilitating their assembly together, and to reduce the likelihood of stress in these members.

The invention comprises, briefly and in a preferred embodiment, a rectangular or other polygonal lamp such as a vehicle headlamp having a lens member joined to a reflector member, the lens member having a rearwardly extending rim fitted against and joined to a front rim of the reflector member, the reflector front rim being provided with frontwardly extending positioning members near at least two diagonally opposite corners and which fit inside corresponding corners of the lens rim for aligning the lens and reflector members together. Preferably four such positioning members are provided respectively near the four corners of a rectangular reflector member. In an alternative embodiment, the extending positioning members are provided on the lens member and fit inside two or more diagonally opposite corners of the reflector rim.

DESCRIPTION OF THE PREFERRED EMBODIMENTS

Figure 1:
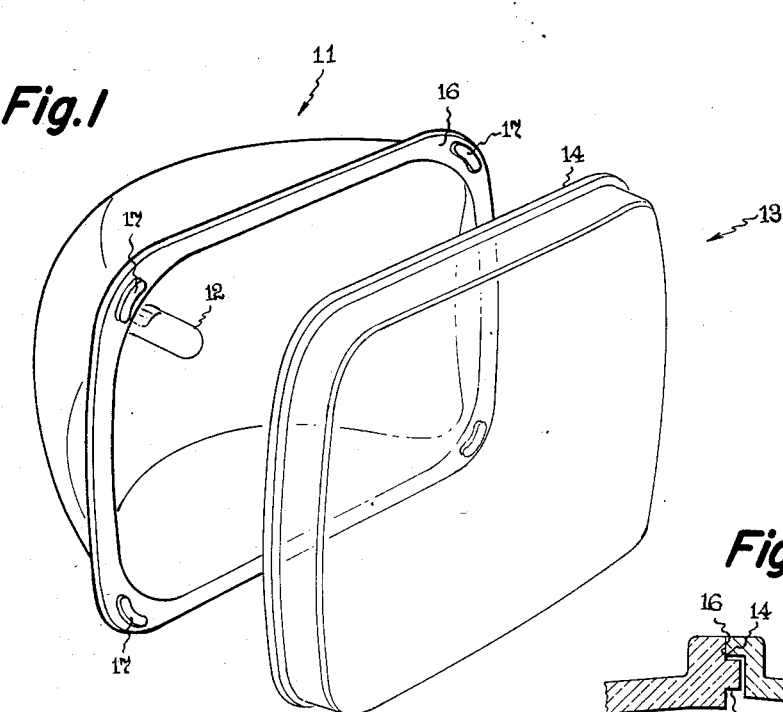
FIG. 1 is a perspective view of a rectangular lamp in accordance with a preferred embodiment of the invention, the lamp's reflector and lens being shown separated to better illustrate their configurations.
Figure 3:
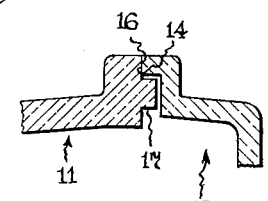
FIG. 3 is a partial sectional view taken on the line 3—3 of FIG. 2.
Figure 2:
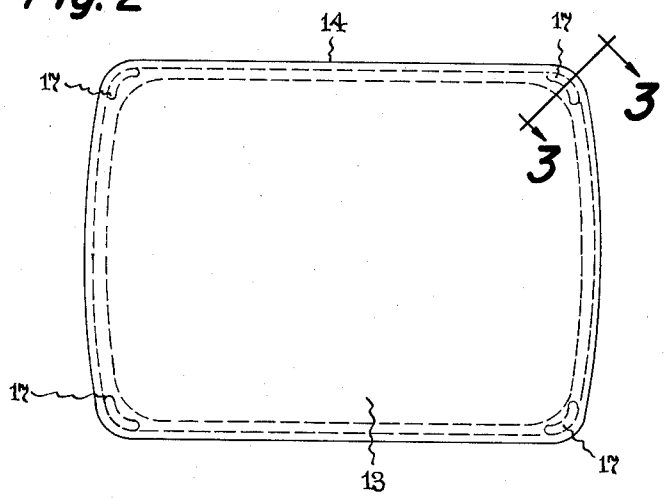
FIG. 2 is a front view of the assembled lamp.

The lamp comprises a concave reflector member 11 which may be of metal, glass or plastic etc. having a reflective coating, and containing a light source 12 which may be a conventional tungsten-halogen light bulb mounted in a conventional manner. A lens member 13, of glass or plastic, shown as having plain front and rear surfaces, may be provided with prism-shaped sections if desired to alter or control the light beam pattern, in well-known manner. The lens 13 and the front opening of the reflector 11 are shown as rectangular, and may if desired have other polygonal shapes.

In accordance with the invention, the lens member 13 is provided with a continuous rearwardly extending rim 14 at its outer periphery, which fits against and is attached to the reflector front rim surface 16. The reflector front rim is provided with a plurality of frontwardly extending positioning members 17, which can be molded or pressed integrally therewith, located near the corners and which fit inside the corners of the lens rim 14 sufficiently closely to align the lens 13 onto the reflector 11 during their attachment together, which may be accomplished with adhesive material which may be air-dried or heat-cured, or by heat-sealing or ultrasonic joining. The positioning members 17, in cooperation with the lens rim 14, maintain the lens and reflector in proper alignment during their attachment together. The lens rim 14 accomplishes the two functions of alignment and of providing a sealing surface, and obviates the need for molding or pressing recesses in the lens for receiving the positioning members 17, thus reducing manufacturing cost and avoiding the likelihood of stress patterns which could cause cracking.

While four positioning members 17 are shown, for aligning purposes at the four corners, alignment can also be achieved with only two such members at diagonally opposite corners. In an alternative embodiment, the positioning members 17 can be provided at the rear of the lens 13 and extend inside two or more diagonally opposite corners of the reflector rim 16.

The stress relief provided in accordance with the present invention results from cooperation between the flat planar rim surfaces 14 and 16 as shown in said FIG. 1 drawing and the positioning members 17 provided only at the corners of the reflector member. More particularly, the only physical contact now permitted between the mating planar rim surfaces 14 and 16 after being sealed together will occur at the corner locations as distinct from prior art rim surfaces having tongue and groove or similar protrubances which interface along substantially the entire length of said contacting rim surfaces. By limiting glass physical contact to the corner regions of said reflector and lens members where a relatively larger glass region exists to provide greater mechanical strength at said corner locations, the residual stress caused when said members are sealed together has now been moved or limited to said corner regions.

While preferred embodiments and modifications of the invention have been shown and described, various other embodiments and modifications thereof will become apparent to persons skilled in the art and will fall within the scope of the invention as defined in the following claims.

What I claim as new and desire to secure by Letters Patent of the United States is:

1. A rectangular shaped all glass lamp comprising a rectangular shaped glass lens member adhesively sealed directly to a correspondingly shaped front of a glass reflector member by cooperating and opposing flat planar sealing surfaces, said lens member being provided with a flat planar surface rim extending toward and substantially against a flat planar mating surface of the reflector member, said reflector member being provided with integral positioning members extending therefrom only at each corner thereof and fitting inside by direct physical abutment with the corners of said extending rim to align the lens and reflector members together, and with said positioning members being spaced apart from the planar sealing surface of said lens member to limit residual stresses to the corner regions when said lens and reflector members are sealed together.

2. A lamp as claimed in claim 1, in which said extending rim is integral with said lens member and said positioning members are integral with said reflector member.

* * * * *